Figure 1:
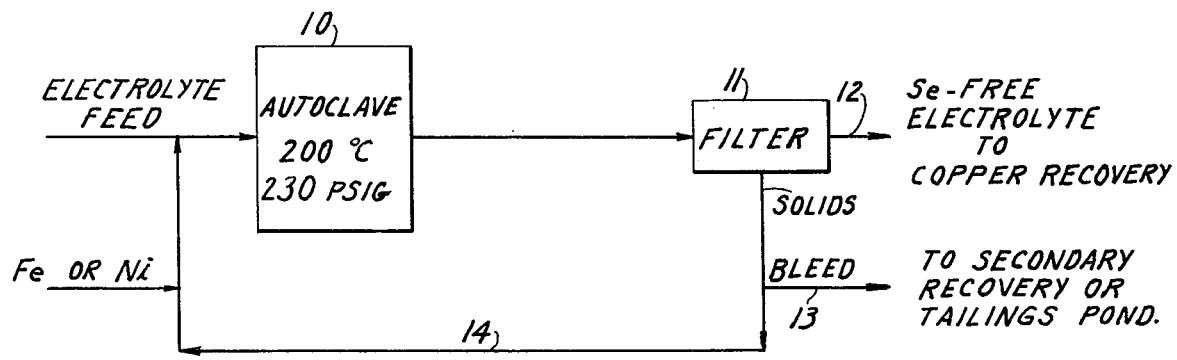

United States Patent [19]

Nikolic et al.

[11] 4,026,797
[45] May 31, 1977

[54] PRECIPITATION OF SELENIUM FROM COPPER ELECTROWINNING SOLUTIONS

[75] Inventors: Cvetko B. Nikolic, Golden; John M. Laferty, Wheat Ridge, both of Colo.

[73] Assignee: Amax Inc., Greenwich, Conn.

[22] Filed: Apr. 19, 1976

[21] Appl. No.: 678,047

[52] U.S. Cl. .................. 210/50; 210/51; 210/56; 423/510; 75/121

[51] Int. Cl.² .......................... C02C 5/02

[58] Field of Search ............ 210/50, 42 R, 56, 51, 210/53, 45, 49, 52, 60, 46, 47; 423/510; 75/121

[56] References Cited

UNITED STATES PATENTS

| 2,889,206 | 6/1959 | Hobin | 423/510 |
| 2,930,678 | 3/1960 | Oberbacher et al. | 423/510 |
| 3,933,635 | 1/1976 | Marchant | 423/510 |

FOREIGN PATENTS OR APPLICATIONS

149,765  9/1961  U.S.S.R. ............. 423/510

*Primary Examiner*—Thomas G. Wyse
*Assistant Examiner*—Benoit Castel
*Attorney, Agent, or Firm*—Kasper T. Serijan; Eugene J. Kalil

[57] ABSTRACT

Selenium is removed from copper electrolytes by adding a substance selected from the group consisting of metals above copper in the electromotive series, excluding alkali metals, such as nickel powder, cobalt powder and iron powder. Sodium sulfide can also be used along with a subsequent addition of ferric sulfate. The amount of the reactive substance added should be sufficient to reduce the selenium content to below 2 ppm.

8 Claims, 2 Drawing Figures

PRECIPITATION OF SELENIUM FROM COPPER ELECTROWINNING SOLUTIONS

This invention relates to a method for removing selenium from copper-containing electrolytes to levels below 2 ppm.

STATE OF THE ART

It is known to leach copper-nickel matte in two stages wherein the finely ground matte is formed as a slurry with a sulfuric acid solution and a substantial portion of the nickel selectively leached from the matte in a hot solution of said acid under oxidizing conditions to provide a solution containing a major portion of the nickel and a low concentration of copper. The residue which contains the bulk of the copper and impurities is then pressure leached with sulfuric acid at an elevated temperature in an autoclave in order to dissolve the copper. Impurities, such as selenium, are generally also dissolved.

In order to prepare the solution for the electrolytic recovery of copper, the dissolved impurities must be removed, especially selenium which adversely affects the electrical conductivity properties of copper.

It is relatively easy to remove iron and other impurities, except selenium. For example, in order to remove iron, the high pressure leach solution, which has a pH in the order of about 0.9, is subjected to an acid-neutralizing step comprising adding an alkaline substance, such as $CaCO_3$, $NH_4OH$, etc., to bring the pH up to 3.5. The solution is aerated to assure an oxidizing condition and iron precipitated out as $Fe(OH)_3$. This precipitation step also removes bismuth and arsenic, among other impurities, but not selenium. Selenium, as stated herein, is anathema to the properties of copper and must also be removed from solution.

Numerous methods have been proposed to facilitate the precipitation of selenium from solution. The use of $SO_2$ as a reductant for selenium is well known, reference being made to U.S. Pat. Nos. 1,730,681, 2,111,112, 2,990,248 and 3,419,355.

Co-precipitation of Se(IV) with metal hydroxides is a well-known analytical method.

The use of a fluidized bed of elemental copper to precipitate selenium is disclosed in a paper entitled "Fluid-Bed Cementation of Selenium Contained in a Copper Electrolyte" by Ph. Charles and P. Hannaert given at the Proceedings of Extractive Metallurgy Division Symposium on Copper Metallurgy of the AIME at Denver, Col., Feb. 15 to 19, 1970. A fluidized bed of elemental copper is maintained by passing the copper electrolyte to be treated through a column in the upward direction through a bed of copper granules of well defined size. Selenium(IV) is converted to $Cu_2Se$, the selenium-depleted solution overflowing into a circular trough and from there to clarifier-settlers where the small $Cu_2Se$-rich particles are removed by decantation.

Some of the disadvantages of the foregoing methods reside in the fact that they fail to provide a product liquor sufficiently low in selenium, for example, less than 1 ppm selenium; they may not be selective; they may not be effective in acid solutions; and they may require that all of the aqueous selenium be present as SE(IV) rather than Se(VI).

OBJECTS OF THE INVENTION

One object of the invention is to provide a method for the removal of selenium from copper-containing sulfuric acid solutions.

Another object is to provide a method for rejecting selenium from sulfuric acid copper sulfate electrolytes to levels below 2 ppm, such as below 1 ppm.

Figure 2:
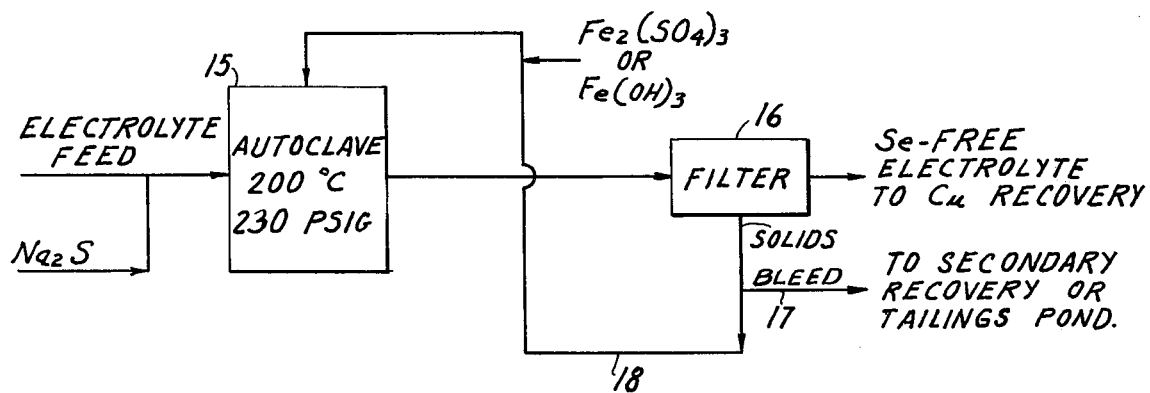

These and other objects will more clearly appear from the following disclosure and the accompanying drawings; wherein FIGS. 1 and 2 are flow sheets illustrating several embodiments of the invention.

STATEMENT OF THE INVENTION

One embodiment of the invention for removing selenium from copper sulfate electrolytes containing more than 2 ppm selenium comprises, adding to a copper electrolyte a substance selected from the group consisting of metals above copper in the electromotive series, excluding alkali metals, such as nickel powder, cobalt powder and iron powder in an amount at least sufficient to reduce the selenium content to below 2 ppm and then subjecting the copper electrolyte to elevated temperature and pressure, for example, to a temperature of at least about 190° C and a pressure of at least about 180 psig to reduce the selenium content fairly rapidly to levels below 2 ppm at fairly short time periods of upwards of 15 or 30 minutes.

In another embodiment, the selenium-removing substance may be sodium sulfide which is used in conjunction with a subsequent addition of $Fe_2(SO_4)_3$. When using sodium sulfide as the reagent, the amount added should not exceed that amount retained in solution corresponding to a maximum of 100 ppm of sodium ion and preferably not exceed 50 ppm sodium ion. Following the addition of sodium sulfide at a temperature of at least about 190° C, an amount of ferric sulfate is added and the solution maintained at a pressure of at least about 180 psig to reduce the selenium to as low as 1 ppm or lower.

The invention is particularly applicable to copper-containing electrolytes obtained in the hydrometallurgy of nickel-copper sulfide mattes. Such electrolytes may contain about 20 to 100 grams/liter Cu, up to about 70 grams/liter Ni, about 5 to 250 grams/liter $H_2SO_4$ and up to about 5 grams/liter Fe, the pH ranging up to about 3 and generally below about 1 pH. Such solutions may contain upwards of about 50 ppm Se.

DETAILS OF THE INVENTION

As illustrative of several embodiments of the invention, the following examples are given in conjunction with the flow sheets of FIGS. 1 and 2.

EXAMPLE 1

One liter of copper-containing electrolyte (pH about 1.4 to 1.6) containing 50 grams/liter Cu, 50 grams/liter of Ni, 25 ppm Se is fed in an autoclave 10 shown in FIG. 1 and 5 grams of nickel powder added and the reaction carried out at 200° C under a pressure of about 230 psig. After 15 minutes, the selenium content is reduced to less than 0.8 ppm. The treated solution is fed to filter 11 and solids filtered therefrom to provide a selenium-free electrolyte 12. The solids 13, less a bleed, is recycled to the autoclave where it is blended with additional electrolyte feed being fed to autoclave 10.

EXAMPLE 2

Using the same flow sheet of FIG. 1, 1 liter of electrolyte (pH about 1.4 to 1.6) containing 50 grams/liter of Cu, 50 grams/liter Ni, 25 ppm Se is fed into autoclave 10 and 5 grams of iron powder added and the reaction carried out at 200° C under a pressure of about 230 psig. After 15 minutes, the selenium content is reduced to less than 1 ppm.

Cobalt may be similarly employed as well as other metals above copper in the electromotive series. To that extent, such metals which do not adversely affect the electrolyte are deemed to be equivalent to the metals Ni, Fe and Co.

EXAMPLE 3

One liter of electrolyte of the same composition as in Examples 1 and 2 containing 25 ppm selenium is fed to autoclave 15 shown in the flow sheet of FIG. 2 to which 0.23 gram of $Na_2S.9H_2O$ is added as shown. The solution is treated for one hour at 200° under a pressure of about 230 psig. Thereafter, ferric sulfate is introduced into the autoclave in an amount corresponding to 5 grams of iron and after 1 hour at 200° C and said pressure of about 230 psig, the selenium is reduced to 1 ppm.

The solution is filtered at 16 to provide a substantially selenium-free electrolyte which goes to copper recovery. The solids 17, less a bleed, is recycled to the autoclave for blending with electrolyte fed to said autoclave 15.

As stated hereinbefore, the reaction in the autoclave is carried out at a temperature of at least about 190° C and a pressure of at least about 180 psig. Generally speaking, the temperature may range from about 190° to 250° C, and the pressure from about 180 to 580 psig.

The amount of nickel, cobalt and iron employed in removing selenium from solution should be at least sufficient to cement out enough copper to remove the selenium in solution. The amount of copper precipitated may be at least 250 moles in excess of the amount of selenium present.

As regards sodium sulfide, the amount employed as stated hereinbefore should not leave more than 100 ppm of sodium ion in solution and preferably not exceed 50 ppm. The amount of ferric sulfate or ferric hydroxide employed should not exceed that amount corresponding to about 5 grams of iron per liter.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for removing selenium from a copper-containing electrolyte solution containing over 2 ppm of total selenium which comprises,
   adding to said copper-containing solution a substance selected from the group consisting of metals above copper in the electromotive series, excluding alkali metals, in an amount at least sufficient to reduce the selenium content to below 2 ppm,
   subjecting said copper-containing electrolyte solution to an elevated temperature of at least about 190° C and a pressure of at least about 180 psig to reduce the total selenium content of said solution to less than 2 ppm by forming a selenium-containing precipitate,
   and then separating the selenium-containing precipitate from said solution.

2. The method of claim 1, wherein the substance added to the copper electrolyte solution for removing selenium from said solution is selected from the group consisting of nickel powder, cobalt powder and iron powder.

3. The method of claim 2, wherein said selenium is removed by adding nickel to said solution.

4. The method of claim 2, wherein said selenium is removed by adding cobalt to said solution.

5. The method of claim 2, wherein said selenium is removed by adding iron to said solution.

6. The method of claim 1, wherein said copper-containing electrolyte solution is a sulfuric acid electrolyte solution and contains about 20 to 100 gpl copper, up to 70 gpl nickel, 5 to 250 gpl $H_2SO_4$ and up to 5 gpl iron, the pH of said solution being less than about 3.

7. A method of removing selenium from a copper-containing electrolyte solution containing over 2 ppm total selenium which comprises,
   adding an amount of $Na_2S$ to said solution sufficient to reduce said selenium to less than 2 ppm,
   the amount of said $Na_2S$ being such as not to exceed 100 ppm of sodium ions in solution,
   subjecting said solution to a temperature of at least about 190° C and a pressure of at least about 180 psig in an autoclave,
   introducing into the autoclave an amount of $Fe_2(SO_4)_3$ not exceeding an amount corresponding to 5 gpl of iron per liter,
   thereby reducing said selenium to less than 2 ppm by forming a selenium-containing precipitate,
   and then separating the selenium-containing precipitate from said electrolyte solution.

8. The method of claim 7, wherein said copper-containing electrolyte solution is a sulfuric acid electrolyte solution and contains about 20 to 100 gpl copper, up to 70 gpl nickel, 5 to 250 gpl $H_2SO_4$ and up to 5 gpl iron, the pH of said solution being less than about 3.

* * * * *